(12) United States Patent
Chen et al.

(10) Patent No.: US 8,330,503 B2
(45) Date of Patent: Dec. 11, 2012

(54) EQUALIZING TRANSCEIVER WITH REDUCED PARASITIC CAPACITANCE

(75) Inventors: Fred F Chen, San Francisco, CA (US); Vladimir M Stojanovic, Stanford, CA (US)

(73) Assignee: Rambus Inc., Sunnyvale, CA (US)

( * ) Notice: Subject to any disclaimer, the term of this patent is extended or adjusted under 35 U.S.C. 154(b) by 1174 days.

(21) Appl. No.: 12/051,273

(22) Filed: Mar. 19, 2008

(65) Prior Publication Data

US 2008/0224739 A1 Sep. 18, 2008

Related U.S. Application Data

(63) Continuation of application No. 11/251,139, filed on Oct. 14, 2005, now Pat. No. 7,348,811, which is a continuation of application No. 10/261,875, filed on Oct. 1, 2002, now Pat. No. 6,982,587.

(60) Provisional application No. 60/395,283, filed on Jul. 12, 2002.

(51) Int. Cl.
*H03B 1/00* (2006.01)

(52) U.S. Cl. ........................ 327/108; 327/170

(58) Field of Classification Search ................. 327/108, 327/112, 170, 379
See application file for complete search history.

(56) References Cited

U.S. PATENT DOCUMENTS

| | | | |
|---|---|---|---|
| 5,381,058 A | 1/1995 | Britton et al. | |
| 5,430,400 A | 7/1995 | Herlein et al. | |
| 5,526,051 A | 6/1996 | Gove et al. | |
| 5,563,549 A * | 10/1996 | Shieh | 327/543 |
| 5,696,773 A | 12/1997 | Miller | |
| 5,767,712 A * | 6/1998 | Takemae et al. | 327/152 |
| 5,844,913 A | 12/1998 | Hassoun | |
| 6,130,854 A | 10/2000 | Gould et al. | |
| 6,369,606 B1 * | 4/2002 | Houghton et al. | 326/36 |
| 6,404,258 B2 | 6/2002 | Ooishi | |
| 6,509,758 B2 | 1/2003 | Piasecki et al. | |
| 6,525,567 B2 | 2/2003 | Koizumi | |
| 6,529,037 B1 | 3/2003 | Haycock et al. | |
| 6,580,294 B1 * | 6/2003 | Fletcher | 326/98 |
| 6,658,505 B2 | 12/2003 | Jin et al. | |
| 6,750,839 B1 | 6/2004 | Hogan | |
| 7,486,119 B2 * | 2/2009 | Lee | 327/158 |
| 2007/0228257 A1 * | 10/2007 | Soltesz et al. | 250/214 A |

OTHER PUBLICATIONS

Raghavan, et al., "Nonuniformly Spaced Tapped-Delay-Line Equalizers," IEEE Transactions on Communications, 41 (9): 1290-1295 (1993).

Ariyavisitakul, et al., "Reduced-Complexity Equalization Techniques for Broadband Wireless Channels," IEEE Journal on Selected Areas in Communications, vol. 15, No. 1, Jan. 1997, pp. 5-15.

Ariyavisitakul, et al., "Tap-Selected Decision-Feedback Equalization," IEEE Transactions on Communications, vol. 45, No. 12, Dec. 1997, pp. 1497-1500.

* cited by examiner

*Primary Examiner* — Long Nguyen

(57) ABSTRACT

A signaling circuit having reduced parasitic capacitance. The signaling circuit includes a plurality of driver circuits each having an output coupled to a first output node, and a plurality of select circuits each having an output coupled to a control input of a corresponding one of the driver circuits. Each of the select circuits includes a control input to receive a respective select signal and a plurality of data inputs to receive a plurality of data signals. Each of the select circuits is adapted to select, according to the respective select signal, one of the plurality of data signals to be output to the control input of the corresponding one of the driver circuits.

14 Claims, 9 Drawing Sheets

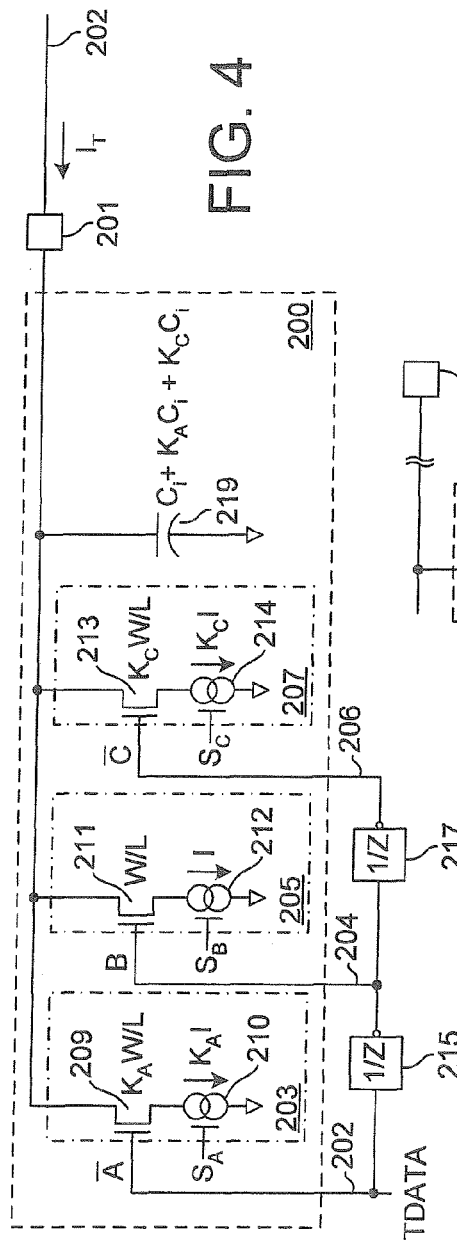
FIG. 4
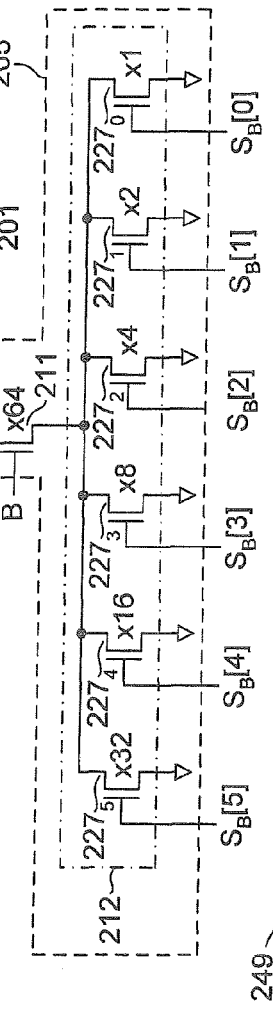
FIG. 5
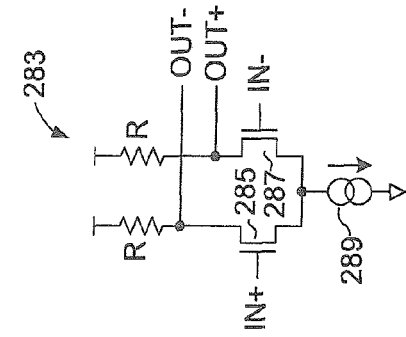
FIG. 8
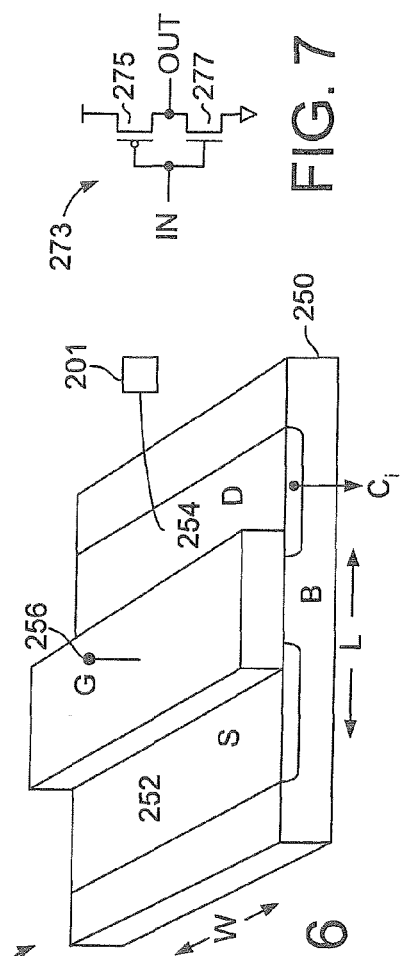
FIG. 7
FIG. 6

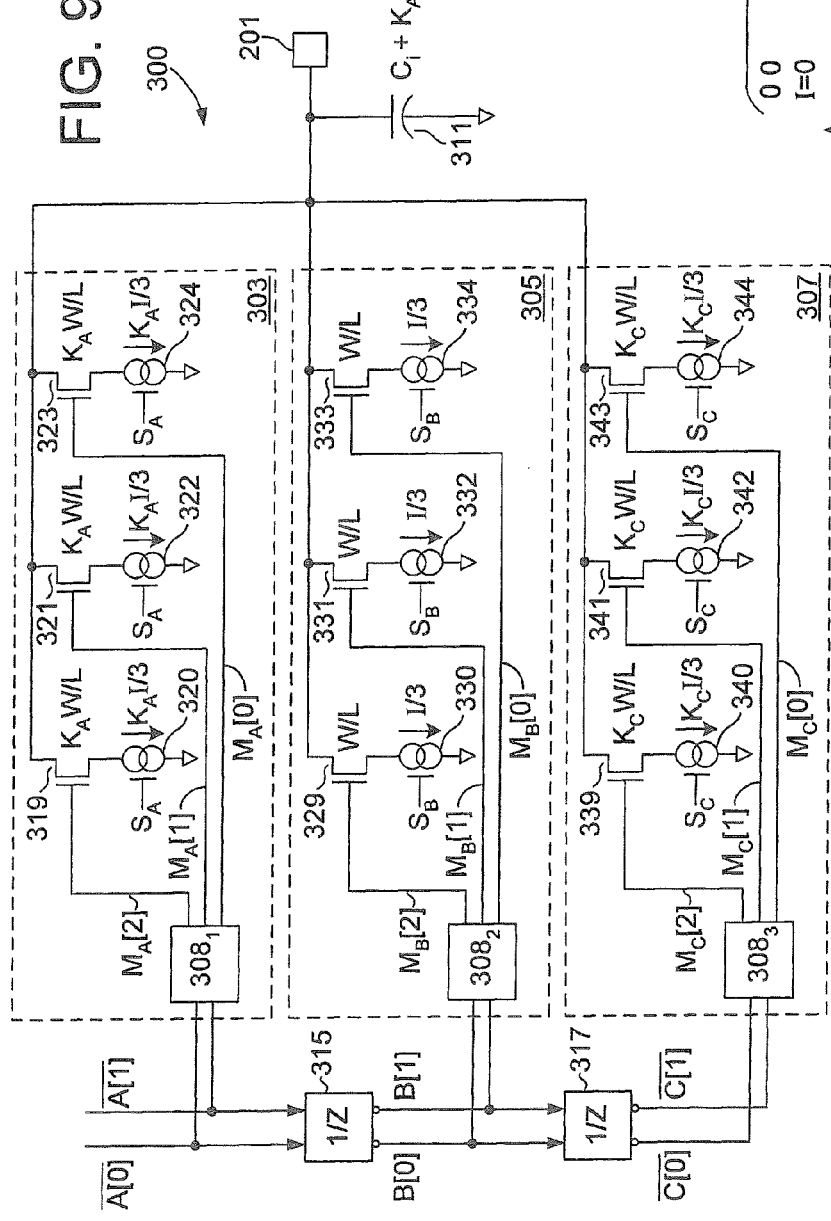
FIG. 9
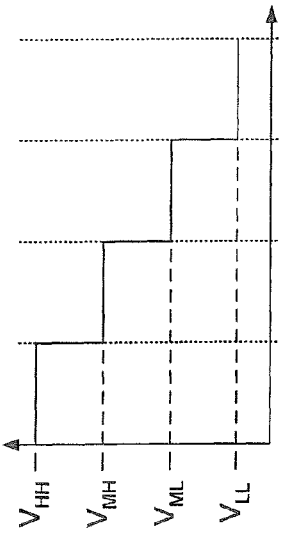
FIG. 11
FIG. 10

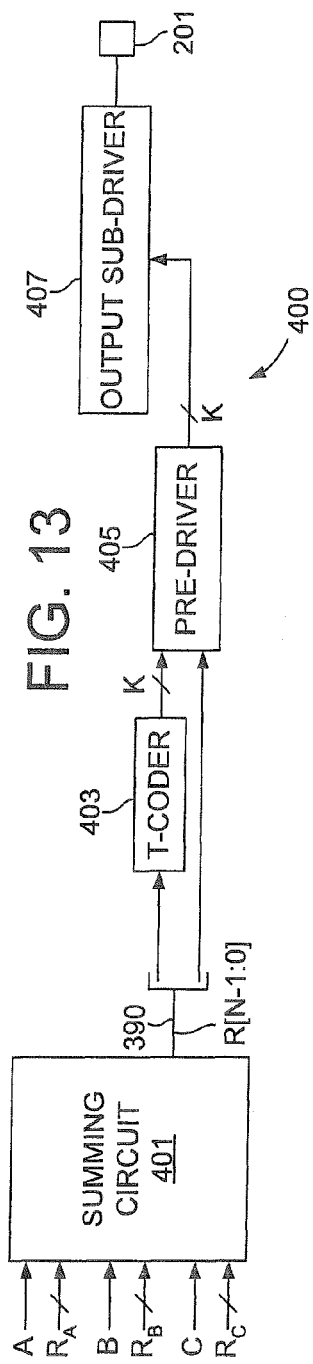
FIG. 13
FIG. 14
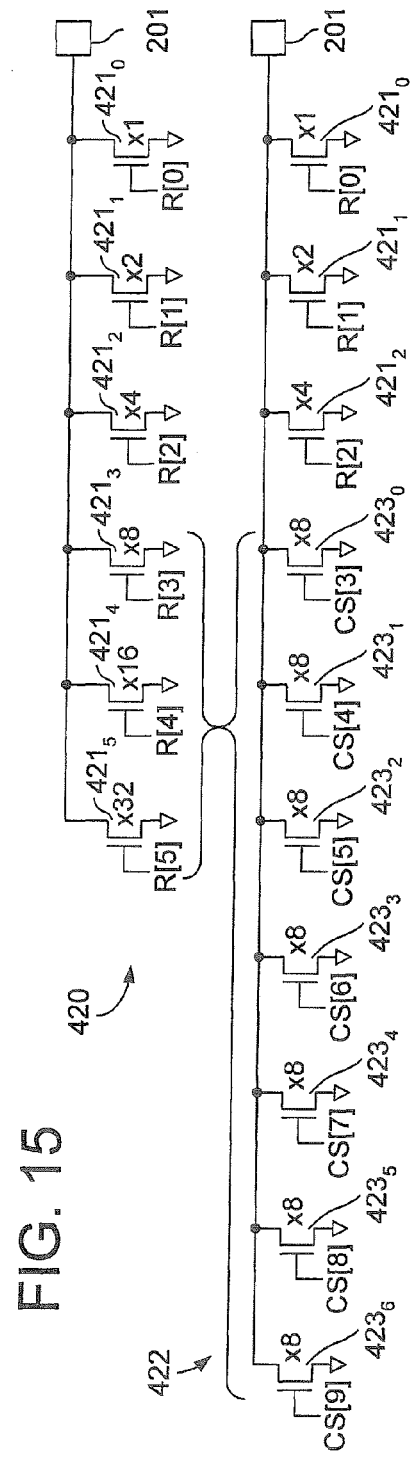
FIG. 15

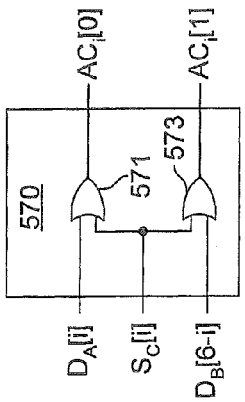

EQUALIZING TRANSCEIVER WITH REDUCED PARASITIC CAPACITANCE

CROSS-REFERENCE TO RELATED APPLICATIONS

This application is a continuation of U.S. patent application Ser. No. 11/251,139 filed on Oct. 14, 2005, now U.S. Pat. No. 7,348,811, which is a continuation of U.S. patent application Ser. No. 10/261,875 filed Oct. 1, 2002, now U.S. Pat. No. 6,982,587, which claims priority from U.S. Provisional Application No. 60/395,283 filed Jul. 12, 2002.

FIELD OF THE INVENTION

The present invention relates generally to high speed signaling within and between integrated circuit devices, and more particularly to reducing parasitic capacitance in an equalizing transceiver.

BACKGROUND

Equalizing driver circuits are often used in high-speed signaling systems to mitigate the effects of inter-symbol interference (ISI) and inductive coupling between neighboring signal paths (i.e., crosstalk). FIG. 1 illustrates ISI in a prior-art signaling system in which data is transmitted as a series of distinct signal levels. At time T1, a logic 0 signal is transmitted on a signal line by pulling the line up to level $V_H$. Subsequently, at time T2, a logic 1 is transmitted by pulling the line down to level $V_L$. Finally, at time T3, a logic 0 is transmitted again by pulling the signal line up to $V_H$. Because the signal driving circuit has finite drive strength (i.e., finite ability to sink and source current), the voltage level of the signal line does not change instantaneously at time T2 or time T3, but rather exhibits a finite slew rate. Consequently, the ideal times for sampling (i.e., in a receiving circuit) the signals output at times T1, T2 and T3 occur at sample times S1, S3 and S3, respectively; after the signal has transitioned to a relative minimum or maximum level and before the signal begins transitioning to a next level. Referring to sample time S2 in particular, note that the level of the signal is affected not only by the logic 1 output at time T2, but also by the logic 0 output at time T1 which, due to the finite slew rate of the transmitter, limits the ability of the signal level to reach and settle at $V_L$. The signal at sample time S2 is also affected by the logic 0 transmitted at time T3 which limits the ability of the signal level to settle and hold at $V_L$. Thus, values transmitted before and after the signal transmitted at time T2 interfere with the level of the T2 signal at the receiver due to ISI.

FIG. 2 illustrates a prior-art output driver 100 in which ISI is reduced by dynamically increasing and decreasing the signal drive strength of the output driver 100 according to the relationship between past, present and future transmit data (TDATA). For example, if a logic 1 is to be transmitted (present data=1), but a logic zero was transmitted previously, the drive strength of the output driver 100 is temporarily increased to achieve faster slew from the logic 0 to logic 1 signal levels, thereby reducing the ISI caused by the previous transmission. Similarly, if a logic 1 is to be transmitted followed by a logic 0, the drive strength of the output driver is temporarily increased to reduce the ISI caused by the subsequent transmission. Such dynamic adjustments to the drive strength of the output driver 100 are referred to as equalization operations, and the output driver is said to be an equalizing output driver.

The output driver 100 includes three sub-driver circuits formed by respective current-sinking drive transistors (109, 111, 113) and corresponding bias current sources (110, 112, 114). The sub-driver circuits drive future, present and past data values, /A, B and /C, respectively (the '/' symbol indicating complement), onto a signal path 102 that is pulled up to a supply voltage through resistor, R. Flip-flops 105 and 107 are coupled in series to form a shift register for producing the present and past data values, B and /C, by shifting an incoming data signal, TDATA (i.e., /A), in response to a transmit clock signal, TCLK. Thus, during a given cycle of the transmit clock signal, /A represents a data value to be transmitted in a subsequent cycle, B represents a data value to be transmitted in the present clock cycle, and /C represents a data value transmitted during the previous clock cycle. The bias currents produced by current sources 110, 112 and 114 are 0.1 I, 0.8 I and 0.1 I, respectively, so that the present data value, when high, draws current 0.8 I (i.e., by switching on transistor 111) to pull the output line 102 low, and the future and past values, when low, each draw current 0.1 I (i.e., by switching on transistors 109 and 113, respectively) to pull the output line low 102 by incremental amounts.

FIG. 3 illustrates the effect of the future, present and past data values on the total current drawn by the prior-art output driver 100 of FIG. 2. At time T1, the future, present and past data values (i.e., $A_{T1}$, $B_{T1}$ and $C_{T1}$) are all zero so that, referring to FIG. 2, transistors 109 and 113 are switched on (i.e., due to the inversions of values A and C), and transistor 111 is switched off. Accordingly, the output driver sinks a current of 0.2 I to represent a steady-state logic 0 condition and the voltage level of output line is pulled down slightly to a nominal, $V_H$ level. At time T2, the values of A, B, and C are shifted such that $C_{T2}=B_{T1}=0$, $B_{T2}=A_{T1}=0$, and $A_{T2}=1$. In this state, the current drawn by the output driver is reduced from 0.2 I to 0.1 I to counteract the ISI that would otherwise result from subsequent transmission of a logic 1 value (i.e., at time T3).

At time T3, the values of A, B, and C are shifted again such that $B_{T3}=A_{T2}=1$, $C_{T3}=B_{T2}=0$, and $A_{T3}=1$. Because B is high and C is low, the output driver sinks a current of 0.9 I; 0.8 I via transistor 111 and 0.1 I via transistor 113. This current level may be understood by viewing the 0.8 I drawn by transistor 111 as being a nominal current needed to produce the present logic 1 value, plus a current 0.1 I drawn by transistor 113 to counteract the ISI from the logic 0 transmitted during the preceding transmission interval.

At time, T4, the present, past and future values are all high (i.e., $A_{T4}=B_{T4}=C_{T4}=1$), so that a current of 0.8 I is drawn to represent the steady-state logic 1 condition. Finally, at time T5, the present and past values remain at logic 1 (i.e., B=C=1), but the future value, A, becomes a logic 0. Consequently, the current drawn by the output driver increases from 0.8 I to 0.9 I to counteract the ISI from the subsequent logic 0 transmission.

Referring again to FIG. 2, signal equalization is achieved by the output driver 100 by driving the output signal line with two additional sub-driver circuits (i.e., sub-driver circuits for past and future data). Because each sub-driver exhibits a parasitic capacitance, $C_i$, the net affect of coupling additional sub-driver circuits to the output signal line is to increase the total parasitic capacitance of the output driver 100 from $C_i$ to $3C_i$. This presents a significant problem in high-speed signaling systems, where the parasitic capacitance of the output driver tends to be a dominant, bandwidth-limiting capacitance of the signaling system. Additionally, transmission paths in high-speed signaling systems are often terminated by termination elements having impedances selected to match the impedance of the transmission paths (i.e., as shown in FIG. 2, R is chosen to match $Z_0$), thereby reducing undesired signal reflections. The increased parasitic capacitance of the equalizing output driver produces a mismatch between the effective termination impedance and the transmission path impedance, thereby increasing the level of signal reflections on the transmission path. Thus, it would be desirable to provide an equalizing output driver having reduced parasitic capacitance.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates an equalizing output driver according to an embodiment of the invention;

FIG. 5 illustrates an exemplary embodiment of the data sub-driver of FIG. 4;

FIG. 6 depicts a metal oxide semiconductor transistor;

FIG. 7 illustrates an embodiment of a push-pull sub-driver circuit;

FIG. 8 illustrates an embodiment of a differential pull-down sub-driver circuit;

FIG. 9 illustrates an embodiment of an equalizing output driver for generating output signals having more than two possible states;

FIG. 10 illustrates an exemplary coding of input bit pair to a corresponding control signal within the equalizing output driver of FIG. 9;

FIG. 11 illustrates the correspondence between bit-pair states and signal levels in a multilevel signaling system;

FIG. 13 is a block diagram of an equalizing output driver having reduced disparity between drive transistor sizes;

FIG. 14 illustrates an exemplary coding operation performed by the thermometer coding circuit of FIG. 13;

FIG. 15 illustrates an output sub-driver that may be driven by the coded control value of FIG. 14;

FIG. 19 illustrates a decoding operation performed within the allocation logic circuit of FIG. 18;

FIG. 20 illustrates a shift operation performed within the allocation logic circuit of FIG. 18;

FIG. 21 illustrates a logic operation within a select logic circuit of FIG. 18;

FIG. 22 illustrates an exemplary embodiment of a select logic circuit;

DETAILED DESCRIPTION

Figure 1:
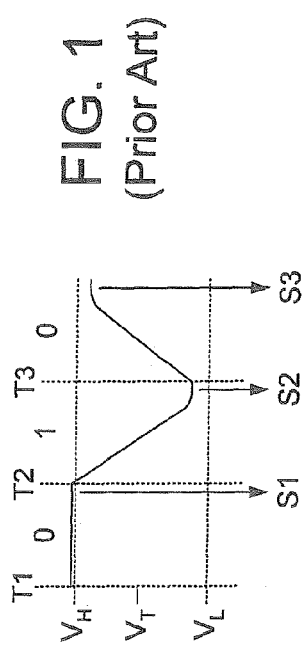
FIG. 1 illustrates inter-symbol interference in a prior-art signaling system.
Figure 2:
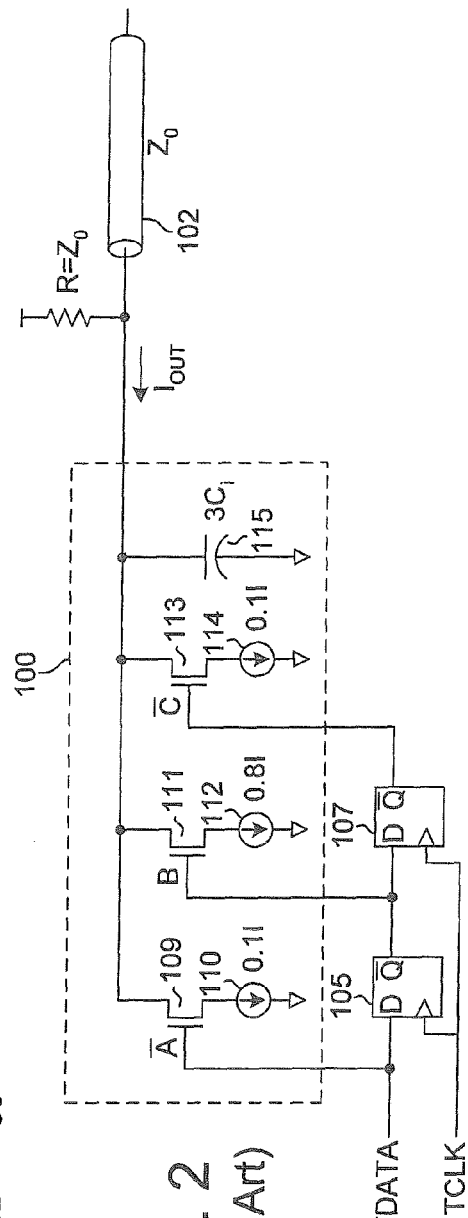
FIG. 2 illustrates a prior-art output driver.
Figure 3:
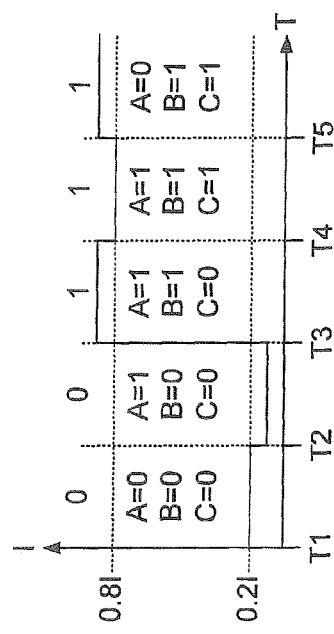
FIG. 3 illustrates the effect of the future, present and past data values on the total current drawn by the prior-art output driver of FIG. 2.

In the following description, for purposes of explanation, specific nomenclature is set forth to provide a thorough understanding of the present invention. However, it will be apparent to one skilled in the art that these specific details may not be required to practice the present invention. In some instances, the interconnection between circuit elements or circuit blocks may be shown as multi-conductor or single conductor signal lines. Each of the multi-conductor signal lines may alternatively be single signal conductor lines, and each of the single conductor signal lines may alternatively be multi-conductor signal lines. A signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. Active low signals may be changed to active high signals and vice-versa as is generally known in the art.

Equalizing Output Driver Having Reduced Parasitic Capacitance

Equalizing output driver circuits having reduced parasitic capacitance are disclosed herein in various embodiments. In one embodiment, equalizing sub-driver circuits within an output driver are scaled relative to a primary signal driver to reduce the parasitic capacitance of the equalizing sub-drivers, and thereby reduce the total parasitic capacitance of the output driver. In another embodiment, weighted equalization values are summed with a weighted primary signal value during each data transmission cycle to produce a drive strength control value. The drive strength control value is applied to an output driver circuit to achieve a signal drive strength that reflects the equalization values and primary signal value. Because the weighted equalization and primary signal values are summed in the digital domain, separate equalizing sub-driver circuits are unnecessary, and may be omitted to reduce the overall parasitic capacitance of the output driver. In another embodiment, an equalizing output driver includes sub-driver circuits that are allocated among primary and equalizing driver pools according to a set of configuration values. Because the sub-driver circuits are, in effect, shared among the primary and equalizing driver groups, the total number of sub-driver circuits is reduced relative to the number of sub-driver circuits otherwise needed to achieve the same range of primary and equalizing signal contributions. The reduced number of sub-driver circuits results in a correspondingly reduced input capacitance.

Equalizing Output Driver Having Scaled Equalizing Sub-Drivers

FIG. 4 illustrates an equalizing output driver 200 according to an embodiment of the invention. The equalizing driver 200 includes a plurality of sub-driver circuits 203, 205 and 207

(i.e., sub-drivers), two of which (203 and 207) are used to contribute equalization levels to a signal output via pad 201, and are therefore referred to herein as equalizing sub-drivers. The remaining sub-driver circuit, 205, is used to drive the output signal according to the data value to be transmitted (i.e., primary data) and is referred to herein as a data sub-driver. In the embodiment of FIG. 4, the equalizing sub-drivers 203 and 207 may further be distinguished according to their data sources. Equalizing sub-driver 207, for example, is responsive to a data value, C, that was transmitted by the data sub-driver 205 in a previous transmission interval (i.e., past data, referred to herein as post-tap data) and is therefore referred to herein as a post-tap sub-driver, or post-tap. Equalizing sub-driver 203, by contrast, is responsive to a data value, A, to be transmitted by the data driver 205 in a subsequent transmission interval (i.e., future data, referred to herein as pre-tap data) and is therefore referred to herein as a pre-tap sub-driver, or pre-tap. In the embodiment of FIG. 4, a single pre-tap sub-driver and a single post-tap sub-driver are shown. In alternative embodiments, any number of pre-tap and post-tap sub-drivers may be provided. In one embodiment, for example, three post-tap sub-drivers (each responding to a successively delayed post-tap datum) and one pre-tap sub-driver are provided. In other embodiments, one or more post-tap sub-drivers may be provided and pre-tap sub-drivers may be omitted entirely. Conversely, one or more pre-tap sub-drivers may be provided and post-tap sub-drivers omitted entirely. In much of the remaining description, embodiments having a single pre-tap sub-driver and a single post-tap sub-driver are described. In all such embodiments, more or fewer pre-tap and post-tap sub-drivers may be provided. Also, the data sub-driver 205 may be omitted, particularly when the equalizing output driver 200 is used within an equalizing receiver, as discussed below.

Still referring to FIG. 4, pre-tap data value, A, is provided to the pre-tap sub-driver 203, in complement form (i.e., /A) via a signal line 204. A delay element 215 (e.g., a flip-flop, latch, delay circuit, etc.) provides a controlled delay (i.e., 1/Z) between the pre-tap and primary data values, A and B. Similarly, a delay element 217 provides a controlled delay between the primary and post-tap data values, B and C. Additional delay elements may be coupled in the data path (i.e., the signal path carrying TDATA) prior to delay element 215 to generate additional pre-tap data values, and additional delay elements may be coupled in the data path after the delay element 217 to generate additional post-tap data values. Pre-tap and post-tap data values may also be provided as either inverted or non-inverted data. In the embodiment of FIG. 4, the delay elements 215 and 217 produce complemented outputs such that, if the pre-tap data value A is driven onto the data line 204 in complemented form, primary data value B is provided to data sub-driver 205 via signal line 206 in uncomplemented form, and post-tap data C is provided to equalizing sub-driver 207 via signal line 208 in complemented form. By this arrangement, the equalizing sub-drivers 203 and 207 contribute to the combined output signal in a manner that counteracts differences between the primary data value B and the pre- and post-tap data values, respectively.

In the embodiment of FIG. 4, each of the data and equalizing sub-drivers 203, 205 and 207 is implemented by a single-ended, pull-down sub-driver circuit. The data sub-driver 205, for example, includes a current source 212 controlled by a bias signal, $S_B$, and a switching transistor 211 that switches the data sub-driver 205 between on and off states in response to high and low logic levels, respectively, of the primary data value, B. Thus, when B is high, transistor 211 is switched on, enabling current I to be drawn from an output line (i.e., via pad 201), thereby pulling down the level of output line 202 (which may be pulled up, for example, by connection via a termination element or circuit). Conversely, when B is low, transistor 211 is switched off, and no current is drawn by the data sub-driver. The equalizing sub-drivers 203 and 207 are similarly implemented by a current sources (210, 214) and a switching transistor (209, 213). The current source 210 is controlled by bias signal, $S_A$, and the current source 214 is controlled by current source, $S_B$.

FIG. 5 illustrates an exemplary embodiment of the data sub-driver 205 of FIG. 4. The data sub-driver includes the switching transistor 211 and current source 212 as described above. The current source 212 includes multiple transistors $227_0$-$227_5$ coupled in parallel between a reference voltage (ground in this example) and a source terminal of the switching transistor 211. Gate terminals of the transistors $227_0$-$227_5$ are coupled to receive respective component signals, $S_B[0]$-$S_B[5]$, of the bias signal, $S_B$. Each of the transistors 227 has a binary weighted gain such that a current of $I_{REF} \times 2^i$ (where i represents the $i^{th}$ transistor in the positions 0, 1, 2, 3, 4, 5) flows through transistor 227; when the corresponding bias signal component and the data value, B, are both high. That is, assuming that B is high and that all the bias signal components $S_B[5]$-$S_B[0]$ are high, then $I_{REF}$ flows through transistor $227_0$, $I_{REF} \times 2$ flows through transistor $227_1$, $I_{REF} \times 4$ flows through transistor $227_2$, $I_{REF} \times 8$ flows through transistor $227_3$, $I_{REF} \times 16$ flows through transistor $227_4$, and $I_{REF} \times 32$ flows through transistor $227_5$. Accordingly, transistors $227_0$-$227_5$ are designated ×1, ×2, ×4, ×8, ×16 and ×32 transistors, respectively. By this arrangement, the bias signal components SB[5]-SB[0] may be set to any of 26 binary patterns to select bias currents that range from 0 to $I_{REF} \times 63$ in increments of $I_{REF}$. In the embodiment of FIG. 5, the switching transistor 211 is designed to deliver a current of $I_{REF} \times 64$; a current substantially equal to the maximum current that can be drawn by the current source 212. In alternative embodiments, the current source 212 may have more or fewer binary weighted transistors (i.e., to enable selection of more or fewer bias currents) and the switching transistor 211 may be scaled to deliver more or less current, accordingly.

In one embodiment of the FIG. 4 output driver, metal oxide semiconductor (MOS) transistors are used to implement the switching transistor and current sources within the sub-drivers 209, 211 and 213, and the relative gains (i.e., transconductance values) of the various implementing transistors (and therefore drive strengths of the sub-drivers) are established by adjusting the width-length ratio (i.e., W/L) of individual transistors. Referring to FIG. 5, for example, the width-length ratio of the ×2 transistor $227_1$ is twice the width-length ratio of the ×1 transistor $227_0$, the width-length ratio of the ×4 transistor $227_2$ is twice the width-length ratio of the ×2 transistor $227_1$, and so forth. Referring to FIG. 6, which depicts a MOS transistor 249 having a source terminal 252 (S), drain terminal 254 (D), gate terminal 256 (G), and body 250 (B), it can be seen that a primary source of parasitic capacitance, $C_i$, occurs at the drain-to body junction (the body 250 forming a dielectric, for example, between the drain terminal 254 and a ground plane). Accordingly, the smaller the area of the drain terminal 254, the lower the parasitic capacitance of the transistor 249. Thus, the width of the transistor 249 may be reduced to produce a corresponding reduction in parasitic capacitance, $C_i$. This relationship between parasitic capacitance and transistor width is exploited in the embodiment of FIG. 4 to achieve an overall reduction in the parasitic capacitance of the output driver 200. More specifically, the equalizing sub-drivers 203 and 207 are implemented in the same manner as the data driver 205 (e.g., as shown in FIG. 5), except that the widths of the switching transistors 209 and 213 within the equalizing sub-drivers 209 and 213 are reduced by scaling factors $K_A$ and $K_C$, respectively, to achieve corresponding reductions in the equalizing sub-driver contributions to the overall parasitic capacitance of the output driver 200. That is, instead of using identical sub-driving circuits for the equalizing and data sub-drivers, (which would yield a combined parasitic capacitance of three times the capacitance, Ci, of the data sub-driver), reduced-width transistors are used to implement the switching transistors 209 and 213 within the equalizing sub-drivers 203 and 207, thereby yielding a combined parasitic capacitance that is less than $3C_i$. More specifically, because the parasitic capacitance of the switching transistors is substantially proportional to the width of the transistors, the combined $C_i$ of the driver circuit 200 is substantially equal to $C_i + K_A C_i + K_C C_i$, where the scaling factors, $K_A$ and $K_C$, are each less than one.

Still referring to FIG. 4, the reduced width of the switching transistors 209 and 213 produces a corresponding transistor gain reduction and therefore reduced drive strength in the equalizing sub-drivers 203 and 205. In one embodiment, the scaling factors $K_A$ and $K_C$ are selected according to the maximum anticipated current draw within the equalizing sub-drivers 203 and 205. For example, if the pre-tap sub-driver 203 is anticipated to draw a maximum current equal to 25% of the data sub-driver current, the pre-tap scaling factor, $K_A$, may be selected to be 0.25. The post-tap scaling factor, $K_C$, may be determined in a similar manner.

Referring again to FIG. 5, it should be noted that, in the case of a scaled post-tap or pre-tap sub-driver (i.e., having reduced width and therefore reduced-gain switching transistor), the maximum bias current drawn by the sub-driver current source may be correspondingly scaled. For example, if the switching transistors 209 and 213 of the pre-tap and post-tap sub-drivers are each scaled to have a gain scaled to 0.25 times the data driver gain, the corresponding current sources 210 and 214 may each be implemented by omitting transistors $227_5$ and $227_4$, thereby providing for a maximum bias current substantially equal to 0.25 times the maximum bias current of the data sub-driver 205. Scaled bias currents within the equalizing sub-drivers 203 and 207 of FIG. 4 are indicated by the bias current designations $K_A I$ and $K_C I$.

Although the equalizing output driver of FIG. 4 has been described in terms of single-ended, pull-down sub-driver circuits (203, 205, 207), virtually any type of sub-driver circuit may be used in alternative embodiments. For example, FIG. 7 illustrates an embodiment of a push-pull sub-driver circuit 273 that sources or sinks current (thereby pulling an output signal (OUT) high or low) according to the level of an input signal (IN) and which may be used in place of the pull-down sub-driver circuits 203, 205, 207 of FIG. 4. In such an embodiment, the drain terminals of component transistors 275 and 277 may be scaled within the equalizing sub-driver circuits to achieve scaled parasitic capacitance. Also, two such push-pull sub-drivers 273 alternatively coupled to IN+ and IN− input signals may be used to implement a differential push-pull sub-driver. FIG. 8 illustrates an embodiment of a differential pull-down sub-driver 283 that may be used in place of the single-ended pull-down sub-drivers 203, 205 and 207 of FIG. 4. The differential pull-down sub-driver 283 includes a pair of transistors having gate terminals coupled to receive differential input signals, IN+ and IN−, and which therefore alternately pull-down output signal lines (OUT− and OUT+) coupled to drain terminals of switching transistors 285 and 287 via resistive pull-up elements, R. Note that the pull-up elements may be implemented by passive or active components, and may be, for example, termination resistances coupled to the output signal lines. As with the switching transistors within the sub-driver circuits of FIG. 4, the width-length ratios of the differentially coupled switching transistors 285 and 287 may be scaled within equalizing sub-drivers to reduce the total parasitic capacitance of the equalizing output driver. Thus, while single-ended pull-down sub-drivers are described in reference to FIG. 4 and in embodiments described below, virtually any type of sub-driver circuit, including combinations of different types of sub-driver circuits, may alternatively be used in such embodiments without departing from the spirit and scope of the present invention.

Referring to FIGS. 4-8, it should be noted that while embodiments implemented by MOS transistors have been described, other process technologies (e.g., bipolar, gallium-arsenide, etc.) may be used to implement the sub-driver circuits of an equalizing driver. More generally, though MOS circuits are described in reference to FIGS. 4-8 and in embodiments described below, any process technology may alternatively be used in such embodiments without departing from the spirit and scope of the present invention.

Equalizing, Multi-level Output Driver

FIG. 9 illustrates an embodiment of an equalizing output driver for generating output signals having more than two possible states (referred to herein as multi-level signals). The equalizing output driver includes three multi-level sub-driver circuits each of which receives two data bits and generates, in response, an output signal having one of four signal levels. In one embodiment, the output driver is coupled, via pad 201, to a pulled-up signal line (not shown) such that each of four different output current levels pulls the signal line down to one of four different voltage levels. Referring to FIG. 11, for example, the four possible states of data bits B[1:0] correspond to four different drive current levels (e.g., 00→0I, 01→I/3, 10→2I/3, and 11→I, though different codings may be used) and therefore to four different voltage levels: $V_{HH}$, $V_{MH}$, $V_{ML}$ and $V_{LL}$. A multilevel signal receiver may distinguish between the four different voltage levels by comparing an incoming multilevel signal against three threshold voltages set to the respective midpoints of the three voltage steps between the $V_{HH}$ and $V_{LL}$.

Still referring to FIG. 9, each of the equalizing sub-drivers and the data sub-driver includes a coding circuit 308 and a set of component sub-drivers. Each of the component sub-drivers is implemented by a switching transistor and adjustable current source in the same manner as described above in reference to FIG. 4, except that the width-length ratios of each of the switching transistors (and the maximum selectable current through the current sources) is reduced by a factor of three. For example, the width-length ratio of each of the switching transistors 329, 331 and 333 of data sub-driver 305 is ⅓ the width-length ratio of the switching transistor 211 within the data sub-driver 205 of FIG. 4, and the bias current drawn by each of the three current sources 330, 332 and 334 within the data sub-driver 305 is ⅓ the bias current drawn by the current source 212 of FIG. 4. By this arrangement, when all three switching transistors within the data sub-driver 305 are switched on, the data sub-driver 305 draws a current substantially equal to I (i.e., I/3+I/3+I/3). The switching transistors (319, 321 and 323) and current sources (320, 322, and 324) within the pre-tap sub-driver 303, and the switching transistors (339, 341 and 343) and current sources (340, 342 and 344) within the post-tap sub-driver 307 are similarly scaled by a factor of three relative to their counterparts in the pre- and post-tap sub-drivers 203 and 207 of FIG. 4.

The coding circuits $308_1$, $308_2$ and $308_3$ each respond to a respective one of the input bit pairs, /A[1:0], B[1:0] and /C[1:0], by generating a corresponding 3-bit control signal, $M_A[2:0]$, $M_B[2:0]$ and $M_C[2:0]$. FIG. 10 illustrates an exemplary coding of input bit pair B[1:0] to a corresponding control signal, $M_B[2:0]$. Input bit pairs /A and /C may be similarly coded to produce control signals $M_A$ and $M_C$. Also, other coding schemes may be used in alternative embodiments. Referring to FIGS. 9 and 10, it can be seen that a different number of component sub-driving circuits is enabled within the data sub-driver 305 for each different state of input bit pair B[1:0]. Specifically, when B[1:0]=00, all three component sub-drivers are switched off (i.e., MB[2:0]=000, switching off transistors 329, 331 and 333), so that the data sub-driver 303 draws zero current (i.e., I=0). When B[1:0]=01, one of the three component sub-drivers is switched on to draw current, I/3; when B[1:0]=10, two of the three component sub-drivers are switched on to draw combined current, 2 I/3; and when B[1:0]=11, all three of the component sub-drivers are switched on to draw a combined, full-scale current, I. In this way, the four different current levels (and voltage levels) described in reference to FIG. 11 may be achieved. Also, the equalizing sub-drivers 303 and 307 similarly contribute equalizing currents according to the pre- and post-tap data bit pairs, A[1:0] and C[1:0]. Specifically, the pre-tap sub-driver 303 contributes an equalizing current that ranges from 0 to $K_AI$ in steps of $K_AI/3$, and post-tap sub-driver 307 contributes an equalizing current that ranges from 0 to $K_CI$ in steps of $K_CI/3$.

In one embodiment, the switching transistors 329, 331 and 333 within the data sub-driver 305 are scaled by transistor width reduction, so that the parasitic capacitance of each component sub-driving circuit within the data sub-driver 305 is substantially equal to one-third the parasitic capacitance of the data sub-driver 205 of FIG. 4 (and so that the total parasitic capacitance of the data sub-driver 305 is substantially equal to the parasitic capacitance, $C_i$, of the data sub-driver 205 of FIG. 4. The switching transistors and (and current sources) within the equalizing sub-drivers 303 and 307 are similarly scaled by a factor of three relative to their counterparts in the equalizing sub-drivers 203 and 207 of FIG. 4. Accordingly, the total parasitic capacitance of the multi-level output driver 300 of FIG. 9 is substantially equal to the total parasitic capacitance of output driver 200 of FIG. 4. That is, the data sub-driver 305 exhibits a full-scale parasitic capacitance of Ci, while the equalizing sub-drivers 303 and 307 each exhibit parasitic capacitances that are reduced relative to Ci, by factors of $K_A$ and $K_C$, respectively.

Comparing the architectures of the equalizing drivers of FIGS. 4 and 9, it can be seen that the sub-driver interconnections between the output pad 201 and the data source is essentially identical, except that multiple bits are provided to each of the multilevel sub-drivers 303, 305 and 307. Thus, any binary-level output driver described herein may readily be adapted for use in a N-level signaling application by coding multiple data bits (and/or pre-tap bits and/or post-tap bits) to generate N−1 control signals, and by further subdividing each sub-driving circuit into N−1 component sub-driving circuits, each component sub-driving circuit being scaled by a factor of 1/(N−1) and controlled by a respective one of the N−1 control signals.

Output Driver with Digital-Domain Equalization

Figure 12:
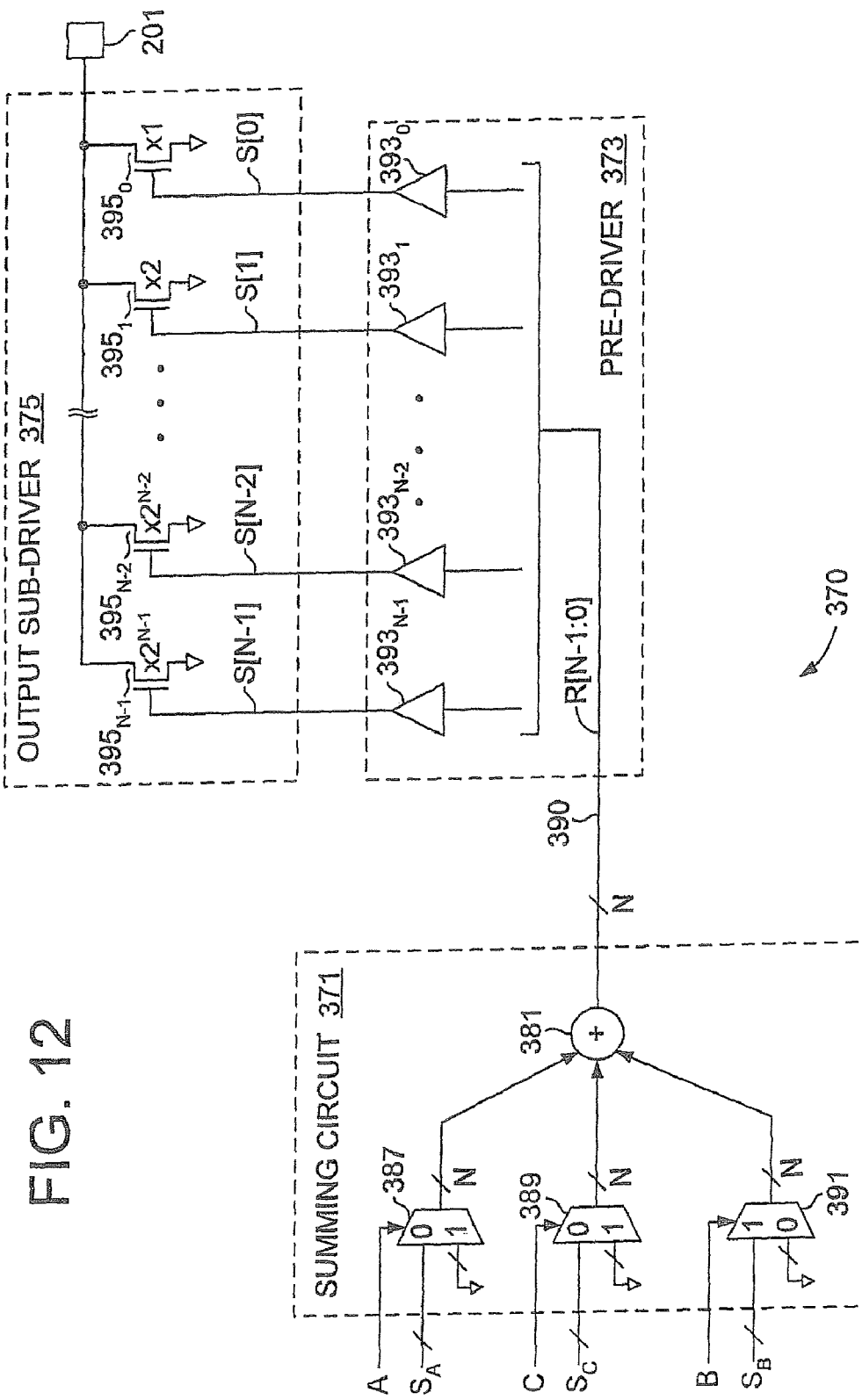
FIG. 12 illustrates an equalizing output driver according to an alternative embodiment of the invention.

FIG. 12 illustrates an alternative embodiment of an equalizing output driver 370 having reduced parasitic capacitance. The equalizing driver 370 includes a summing circuit 371, pre-driver 373, and output sub-driver 375. The summing circuit 371 includes multiplexers 387, 389 and 391, and adder 381 to combine the output signal contributions indicated by bias control values $S_A$, $S_B$ and $S_C$, according to the states of the corresponding pre-tap, primary and post-tap data values, A, B and C. The multiplexer 387 outputs the pre-tap bias control value $S_A$ to the adder 381 if pre-tap data value, A, is low (i.e., if /A is high), and otherwise passes a zero value to the adding circuit. Similarly, multiplexer 389 outputs either the post-tap bias control value, $S_C$, or a zero value to the adder 381 according to whether the post-tap data value, C, is low or high, respectively, and multiplexer 391 outputs either the primary bias control value, $S_B$, or a zero value to the adder 381 according to whether the primary data value, B, is high or low, respectively. The adder 381 sums the values output by the multiplexers 387, 389 and 391 to generate an N-bit summed control signal 390, R[N−1:0], that represents the summed, weighted contributions of the pre-tap, primary and post-tap values. The N constituent bits of the summed control signal 390 are amplified by N amplifiers, $393_0$-$393_{N-1}$, within the pre-driver 373, then applied to gate terminals of respective binary weighted drive transistors, $395_0$-$395_{N-1}$, within the output sub-driver 375 to achieve an equalized output signal. Because the contributions of the pre-tap and post-tap data values are applied in the digital domain (e.g., by logic within the summing circuit 371), a single sub-driver 375 may be used (i.e., as opposed to providing separate output drivers for pre-tap and post-tap equalization purposes). Thus, even though the output sub-driver 375 includes multiple transistors 395 coupled to the output pad 201, the maximum current drawn by the output sub-driver is nominally the same, for example, as the maximum current, I, drawn by the data sub-driver 205 of FIG. 4. That is, the width-length ratios of the N binary weighted drive transistors 395 are such that the largest drive transistor $395_{N-1}$ has one-half the width-length ratio of the switching transistor 211 of the FIG. 4 data sub-driver, the next largest drive transistor $395_{N-2}$ has one fourth the width-length ratio of the switching transistor 211 and so forth such that the combined size of all the transistors $395_{N-1}$-$395_0$ is substantially the same as the size of the switching transistor 211. Accordingly, the total parasitic capacitance of the equalizing driver 370 is roughly equal to the parasitic capacitance, $C_i$, of the FIG. 4 data sub-driver 205 alone.

Still referring to FIG. 12, the larger drive transistors within the output sub-driver 376 tend to have a larger gate capacitance than the smaller drive transistors and therefore require greater charge transfer to the gate terminal in order to achieve the same operating point. Accordingly, in the embodiment of FIG. 12, the pre-drive amplifiers $393_{N-1}$-$393_0$ within the pre-driver 373 are designed to have different drive strengths (i.e., gains) according to the width/length ratio of the drive transistor to be controlled. For example, the amplifier $393_{N-1}$ has a greater drive strength (i.e., signal gain) than amplifier $393_{N-2}$; amplifier $393_{N-2}$ has a greater drive strength than amplifier $393_{N-3}$ and so forth. By implementing pre-drive amplifiers 393 with different drive strengths in this manner, each of the signal driving transistors 395 within the output sub-driver 375 may be switched from an off condition to a desired operating point (e.g., in saturation) in substantially the same amount of time.

Returning briefly to FIG. 4, it should be noted that, depending on the size difference between the switching transistor 211 within the data sub-driver and the switching transistors 209 and 213 within the pre-tap and post-tap sub-drivers, it may also be desirable to provide different-strength pre-drive amplifiers to drive the pre-tap, post-tap and data values to the gates of switching transistors 209, 211, 213, respectively.

Referring again to FIG. 12, numerous types of circuits may be used to implement the adder 381 including, without limitation, combinatorial logic, a dedicated state machine, a general purpose processor, a digital signal processor, etc. More generally, any circuitry capable of selectively adding the bias control values $S_A$, $S_B$ and $S_C$ (i.e., according to the states of the corresponding data values) may be used to implement the summing circuit 371. Also, the summing circuit 371 may readily be adapted to sum the pre-tap and post-tap contributions of multiple bits, for example, where there are more or fewer pre- and/or post-tap values than shown in FIG. 12, or where multi-level output signals are to be generated.

Referring again to the output sub-driver 375, because each of the drive transistors $395_0$-1-$395_{N-1}$ have finite output resistance (i.e., the drain voltage increases with drain-to-source current, even in saturation) and because the gains of each of the transistors are different, it may be difficult to achieve precisely the same output voltage at the drain terminal of each drive transistor 395. The resulting voltage differentials between the drain terminals of the drive transistors 395 may result in undesirable distortion of the output signal. In one embodiment, this distortion is substantially reduced by thermometer coding the most significant bits of the summed control signal 390 and distributing the drive responsibility of the highest-gain sub-driver transistors (the primary distortion contributors) among multiple, smaller-gain drive transistors. FIG. 13 is a block diagram of an equalizing output driver 400 according to such an embodiment. As shown, the equalizing output driver 400 includes a summing circuit 371, thermometer coding circuit 403, pre-driver 405 and output sub-driver 407. The summing circuit 371 operates as described in reference to FIG. 12 to generate an N-bit summed control value 390, R[N−1:0]. The thermometer coding circuit 403 decodes a selected number of the most significant bits of the control signal 390 to generate a K-bit coded control value, CS. The coded control value and least significant bits of the summed control value 390 are amplified by the pre-driver 405 (i.e., according to size differences of drive transistors within the output driver) and output to constituent drive transistors within the output sub-driver 407. It should also be noted that the implementation can be done with or without any combination of the thermometer coding circuitry and the pre-driver circuitry.

FIG. 14 illustrates an exemplary coding operation performed by the thermometer coding circuit of FIG. 13. For purposes of example only, the summed control value is assumed to be a six bit value, R[5:0], in which the most significant three bits, R[5:3], are coded to generate a seven bit coded control value CS[9:3]. In the exemplary coding depicted, the coded control value, CS[9:3], includes a number of logic high bits according to the numeric value of summed control bits R[5:3]. That is, if bits R[5:3]=000, then none of the bits CS[9:3] are high; if R[5:3]=001 (decimal 1), then one of the bits CS[9:3] is high; if R[5:3]=010 (decimal 2), then two of the bits CS[9:3] is high, and so forth.

FIG. 15 contrasts an output sub-driver 420 that may be driven by the 6-bit summed control value of FIG. 14 and an output sub-driver 422 that may be driven by a combination of the coded control value of FIG. 14 and the least significant bits of the summed control value. As shown, the three largest drive transistors, $421_5$-$421_3$ (i.e., the ×32, ×15 and ×8 transistors), within the output sub-driver 420 are replaced in the output sub-driver 422 by seven drive transistors, $423_6$-$423_0$, each having a ×8 drive strength. Because the number of high CS bits coupled to the seven ×8 drive transistors is equal to the value of the R[5:3] bits, a number of the ×8 transistors within the output sub-driver 422 are turned on in accordance with the value of the R[5:3] bits. Thus, the output sub-driver 422 exhibits a drive strength equal to that of output sub-driver 420 (i.e., for a given value of the R[5:3] bits) using drive transistors no larger than ×8. Consequently, the output distortion caused by differences in drive transistor sizes in is reduced relative to the output sub-driver 420. The least significant three bits of the summed control value, R[2:0], are used to drive the smaller transistors, $421_2$-$421_0$, within each of the output sub-drivers 420 and 422. Note that specific numbers of control signal bits and drive transistors have been described in reference to FIGS. 14 and 15 for purpose of example only. Different numbers of control signal bits and drive transistors may be used in alternative embodiments. Also, more or fewer of the most significant bits of the summed control value, R, may be coded in alternative embodiments. Further, coding schemes other than that shown in FIG. 14 may be used in alternative embodiments.

Equalizing Output Driver with Allocated Sub-Drivers

Figure 16:
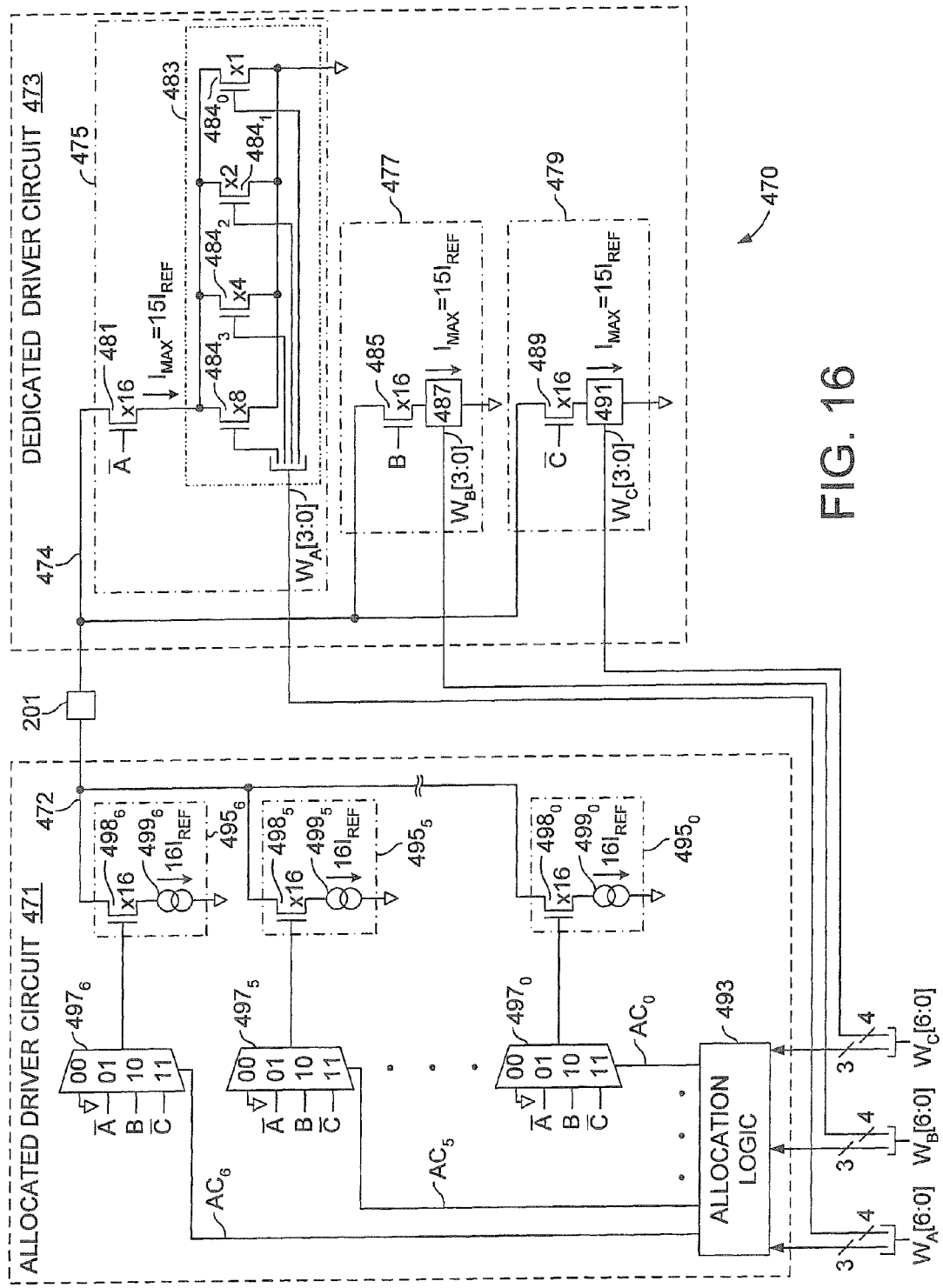
FIG. 16 illustrates an equalizing output driver according to another embodiment of the invention.

FIG. 16 illustrates an equalizing output driver 470 according to another embodiment of the invention. The equalizing output driver 470 includes an allocated driver circuit 471 and dedicated driver circuit 473, and receives primary data value B, and pre- and post-tap data values A and C as inputs. The equalizing output driver 470 additionally receives multi-bit weight values, $W_A$, $W_B$ and $W_C$, as inputs. The weight values represent the relative output signal contributions of primary and equalizing data values during each transmission interval, and may be provided by a configuration circuit (not shown) within an integrated circuit containing the equalizing output driver 470 or, alternatively, by an off-chip source including, without limitation, another integrated circuit device or printed circuit board strapping. The least significant bits (LSBs) of the weight values, $W_A$, $W_B$ and $W_C$, are supplied to the dedicated driver circuit which, in response, outputs an equalized, least-significant-bit (LSB) signal to pad 201 via signal line 474. The most significant bits (MSBs) of the weight values are provided to the allocated driver circuit 471 which, in response, allocates sub-drivers 495 within the allocated driver circuit 471 among data-driving, and pre- and post-tap driver pools. That is, the allocated driver circuit 471 enables a sub-driver 495 not needed for equalization purposes to be used as a data sub-driver (and vice-versa), thereby lowering the overall number of sub-drivers 495 that would be necessary to achieve the same range of data and equalizing drive strengths in absence of such sub-driver allocation. The reduced number of sub-drivers 495 coupled to the output pad 201 (i.e., via signal path 472) results in a corresponding reduction in parasitic capacitance of the equalizing output driver 470.

In the exemplary embodiment of FIG. 16, each of the weight values, $W_A$, $W_B$ and $W_C$, are 7-bit values, the most significant three bits of which are provided to the allocated driver circuit 471 and the least four significant bits of which are provided to the dedicated driver circuit 473. The weight values may include more or fewer bits in alternative embodiments, and the distribution of the constituent bits of the weight values between the allocated and dedicated driver circuits may be different. The allocated driver circuit 471 includes allocation logic 493 which responds to the most significant bits of the weight values by generating a multi-bit allocation control signal, AC. In the embodiment of FIG. 16, the allocation control signal is a fourteen-bit signal (more or fewer bits may be used in alternative embodiments) in which respective groups of two bits are coupled to select inputs of multiplexers $497_0$-$497_6$. That is, allocation control bit pair $AC_0[1:0]$ is coupled to the select input of multiplexer $497_0$, allocation control bit pair $AC_1[1:0]$ is coupled to the select input of multiplexer $497_1$, and so forth to allocation control bit pair $AC_6[1:0]$ which is coupled to the select input of multiplexer $497_6$. Each of the multiplexers 497 includes four input ports (designated '00', '01', '10' and '11' in FIG. 16) coupled respectively to receive a logic low signal, complemented pre-tap data value (/A), primary data value (B), and complemented post-tap data value (/C). Each of the sub-drivers $495_0$-$495_6$ includes a switching transistor ($498_0$-$498_6$, respectively) having a gate terminal coupled to the output of a respective one of the multiplexers $497_0$-$497_6$, and a current source ($499_0$-$499_6$, respectively) biased to draw current, $I_{REF} \times 16$. By this arrangement, each of the sub-drivers 495 may selectively be controlled by either a pre-tap data value, /A, primary data value, B, or post-tap data value, /C. Each sub-driver circuit 495 selected to be controlled by a pre-tap data value is referred to as a pre-tap sub-driver and is said to be allocated to a pre-tap pool (the pre-tap pool including one or more pre-tap sub-drivers). Similarly, each sub-driver 495 selected to be controlled by a post-tap data value is referred to as a post-tap sub-driver and is said to be allocated to a post-tap pool, and each sub-driver 495 selected to be controlled by a primary data value is referred to as a data sub-driver and is said to be allocated to a data driver pool. Thus, each of the sub-drivers 495 within the allocated driver circuit may be allocated to a pre-tap, post-tap or data driver pool, with the allocation in a given application being determined by the allocation signal, AC, and therefore by the most significant bits of the weight values, $W_A$, $W_B$ and $W_C$. In the embodiment of FIG. 16, any unallocated sub-driver 495 (i.e., sub-driver not needed within the pre-tap, post-tap or data driver pools) is disabled by selection of the ground reference input to port '00' of the corresponding multiplexer 497. The current source 499 within each unallocated sub-driver 495 may also be disabled.

The dedicated driver circuit 473 includes a dedicated data sub-driver 477, dedicated pre-tap sub-driver 475 and dedicated post-tap sub-driver 479, all implemented generally as described in reference to FIG. 4, except that the pre- and post-tap sub-drivers 475 and 479 are not scaled (i.e., the switching transistors and current sources of the data, pre- and post-tap sub-drivers have the same current sinking capability). Also, the least significant bits (LSBs) of weight values, $W_B$, $W_A$ and $W_C$, constitute the bias control signals for the current sources within the data sub-driver 477, pre-tap sub-driver 475 and post-tap sub-driver 479, respectively. In the embodiment of FIG. 16, the switching transistors 485, 481 and 489 within the data sub-driver 477, and pre-tap sub-driver 475 and post-tap sub-driver 479, respectively, each have substantially the same width-length ratio as the switching transistors 498 within the sub-drivers 495 of the allocated driver circuit (e.g., ×16 transistors). By this arrangement, all the transistors coupled to pad 201 within the equalizing output driver 470 have substantially the same size, thereby avoiding the distortion that may occur when differently sized transistors are used. In the embodiment of FIG. 16, the current sources 487, 483 and 491 within the data sub-driver 477, pre-tap sub-driver 475 and post-tap sub-driver 479 each include four binary weighted transistors (as shown in expanded view within pre-tap sub-driver 475) having drive strengths $I_{REF} \times 1, \times 2, \times 4$ and $\times 8$. Accordingly, a bias current ranging from 0 to $I_{REF} \times 15$ in steps of $I_{REF}$ may be selected within the data sub-driver 477, and pre- and post-tap sub-drivers 475 and 479 according to the LSBs of the weight values, $W_B$, $W_A$ and $W_C$, respectively.

Figures 17, 18:
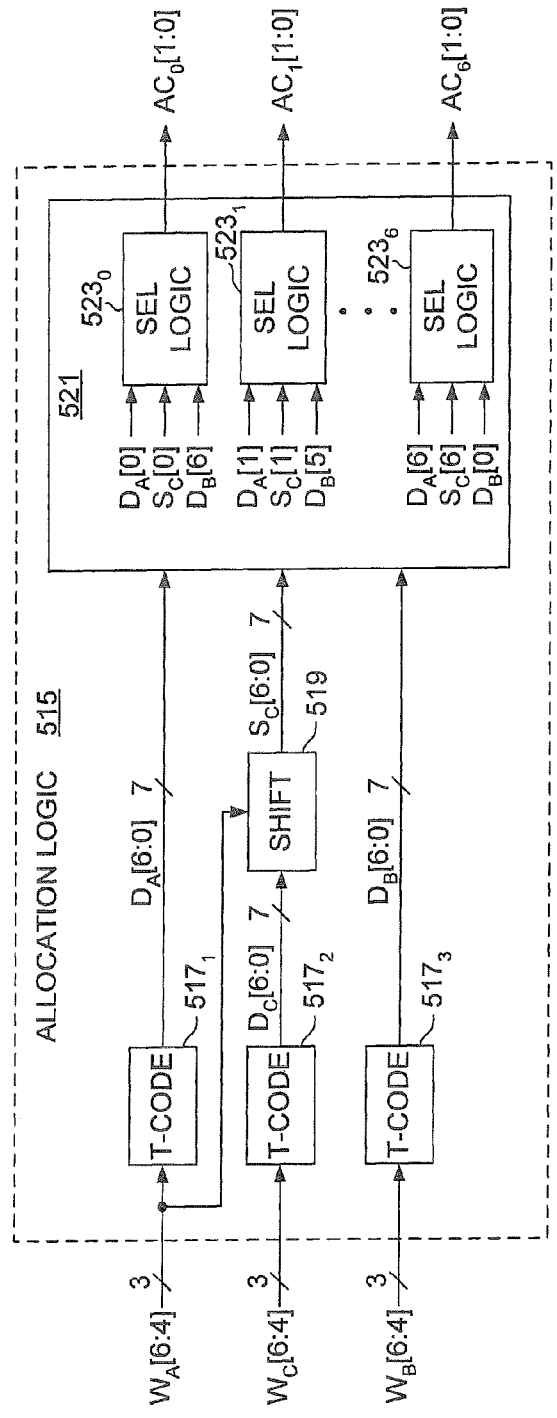
FIG. 17 illustrates the operation of the equalizing output driver of FIG. 16 in response to exemplary weighting values.
FIG. 18 illustrates an embodiment of an allocation logic circuit that may be used to implement the allocation logic of FIG. 16.

FIG. 17 is a table 505 that illustrates the operation of the equalizing output driver 470 of FIG. 16 in response to exemplary values of weights, $W_A$, $W_B$ and $W_C$. In a first example, the pre- and post-tap weights, $W_A$ and $W_C$, are zero, and the data drive weight, $W_B$, is a maximum value ($127 \times I_{REF}$ in this example). In this configuration, the pre- and post-tap data values do not affect the output signal generated by the equalizing output driver 470 and, instead, the data value, B, alone determines the output signal. To achieve the ×127 data drive strength (i.e., $I_{REF} \times 127$), the MSBs of the weight value, $W_B$, are all high to allocate all seven ×16 sub-drivers 495 within the allocated driver circuit 471 to the data driver circuit (illustrated in table 505 by the selection of the data value, B, by each of the allocation control bit pairs, $AC_0$-$AC_6$, within the allocated driver circuit), and all the LSBs of the weight value, $W_B$, are high to enable the full ×15 drive strength of the dedicated data sub-driver 477. Thus, a data drive strength of $(7 \times 16) + 15 = 127 \times I_{REF}$ is achieved. None of the sub-drivers within the allocated driver circuit are allocated to the pre- or post-tap pools, and all the LSBs of the pre- and post-tap weight values are low, thereby disabling signal contributions from the dedicated pre- and post-tap sub-drivers 475 and 479.

The second row of table 505 presents a second example of the operation of the equalizing output driver 470 in which, $W_A = 12$, $W_B = 102$ and $W_C = 13$. Because neither of the pre- or post-tap weights is greater than 15, none of the sub-drivers 495 within the allocated driver circuit 471 are allocated to the pre- and post-tap driver pools. Instead, the dedicated pre- and post-tap drivers are enabled to draw ×12 and ×13 currents by the setting of the pre- and post tap weight LSBs (i.e., $W_A[3:0]=12$ and $W_C[3:0]=13$). Because the specified data drive strength is less than 112 (i.e., the total data drive strength of all the unallocated sub-drivers 495 within the allocated driver circuit 471), one of the sub-drivers 495 within the allocated driver circuit 471 is disabled (indicated in FIG. 17 by the selection of '0' by the allocation control bit pair, $AC_0$), and six sub-drivers 495 are allocated to the data driver pool, thereby providing a ×96 data drive strength. The dedicated data sub-driver 477 is used to provide the remaining ×6 drive strength (i.e., $W_B[3:0]=6$).

Row three of table 505 presents a third example in which $W_A = 23$, $W_B = 94$ and $W_C = 10$. Because the pre-tap weight, $W_A$, is greater than 15, the dedicated pre-tap sub-driver 475 is insufficient by itself to provide the specified drive strength. Accordingly, a ×16 sub-driver 495 within the allocated driver circuit 471 is allocated to the pre-tap driver pool (indicated in FIG. 17 by the selection of pre-tap data source 'A', by allocation control bit pair $AC_0$) to provide a ×16 pre-tap drive strength, with the remaining ×7 pre-tap drive strength being supplied by the dedicated pre-tap sub-driver 475. Because the post-tap weight, $W_C$, is less than 16, the specified post-tap drive strength is provided entirely by the dedicated post-tap sub-driver 479. Finally, because the specified data drive strength is less than 6×16, but greater than 5×16, five sub-driver circuits within the allocated driver circuit are allocated to the data driver pool to provide a ×80 data drive strength, and a value of $W_B[3:0]=14$ is applied to the dedicated data sub-driver 477 to provide the remaining ×14 data drive strength.

Row four of the table 505 illustrates another example of the operation of the equalizing output driver 470 of FIG. 16, in this case with $W_A = 17$, $W_B = 89$ and $W_C = 21$. In this example, one sub-driver 495 within the allocated driver circuit 471 is allocated to the pre-tap driver pool, another sub-driver 495 is allocated to the post-tap driver pool and five sub-drivers 495 are allocated to the data driver pool, thereby providing pre-tap, post-tap and data drive strengths of ×16, ×16 and ×80, respectively. The remaining ×1 pre-tap drive strength is supplied by the dedicated pre-tap sub-driver 475; the remaining ×5 post-tap drive strength is supplied by the dedicated post-tap sub-driver 479 and the remaining ×9 data drive strength is supplied by the dedicated data sub-driver 477.

FIG. 18 illustrates an embodiment of an allocation logic circuit 515 that may be used to implement allocation logic 493 of FIG. 16. The allocation logic circuit 515 includes coding circuits $517_1$, $517_2$ and $517_3$, shift circuit 519 and control signal generator 521. The coding circuits 517 receive the MSBs of the pre-tap, data, and post-tap weight values, respectively (i.e., $W_A$, $W_B$ and $W_C$), and, in response, generate decoded pre-tap, data and post-tap values $D_A$, $D_B$ and $D_C$. In one embodiment, illustrated by table 540 of FIG. 19, each decoded value includes $2^N-1$ bits in which the number of high bits corresponds to the numeric value represented by selected MSBs of the corresponding weight value (N being the number of weight MSBs). Specifically, in the exemplary decoding shown by table 540, there are three input bits (i.e. weight bits W[6:4]) and seven (23-1) constituent bits of the decoded value, D[6:0]. When the numeric value of W[6:4] is zero (i.e., W[6:4]=000b, 'b' indicating binary notation), none of the decoded bits, D[6:0] is high. When the numeric value of W[6:4] is one (i.e., W[6:4]=001b), one of the decoded bits is high (bit D[0] in this example). Similarly when the numeric value of W[6:4] is two, two of the decoded bits are high; when the numeric value of W[6:4] is three, three of the decoded bits are high; and so forth until the numeric value of W[6:4] is seven (i.e., W[6:4]=111b) in which case all seven of the decoded bits, D[6:0] are high. The coding scheme shown in FIG. 19 is referred to herein as a thermometer code and the coding circuits of FIG. 18 are referred to as thermometer coding circuits. Other coding schemes may be used in alternative embodiments.

The decoded post-tap value, $D_C$, is input to the shift circuit 519, along with the MSBs of the pre-tap value (i.e., $W_A[6:4]$ in this example). In one embodiment, the shift circuit 519 shifts the bit pattern of the decoded post-tap value according to the numeric value represented by the MSBs of the pre-tap value. Thus, as shown in table 550 of FIG. 20, when the numeric value of $W_A[6:4]$ is zero, the decoded post-tap value, $D_C[6:0]$, is shifted left by zero bit positions to generate the shifted post-tap value, $S_C[6:0]$. When the numeric value of $W_A[6:4]$ is one, the decoded post-tap value is shifted left by one bit; when the numeric value of $W_A[6:4]$ is two, the decoded post-tap value is shifted left by two bits and so forth. Referring to FIGS. 19 and 20, it can be seen that the shifting of the decoded post-tap value according to the numeric value of the pre-tap MSBs effectively aligns the decoded pre and post-tap values so that high bits within the two values do not fall within the same bit positions. That is, if the shifted post-tap value, $S_C$, is logically ORed with the decoded pre-tap value, $D_A$, the number of high bits in the resultant value will be equal to the combined number of high bits within the $D_A$ and $D_C$ values.

Referring again to FIG. 18, the shifted post-tap value, $S_C$, is input to the control signal generator 521 along with the decoded pre-tap value, $D_A$, and the decoded data value, $D_B$. The control signal generator 521 includes a number of select logic circuits $523_0$-$523_6$ each of which generates a respective one of the allocation control bit pairs, $AC_0[1:0]$-$AC_6[1:0]$. Each select logic 523 circuit receives a respective bit of the decoded pre-tap value, $D_A$, the shifted post-tap value, $S_C$, and the data value $D_B$. In one embodiment, the connections of the constituent bits of the decoded data value, $D_B$, to the select logic circuits 523 is in reverse order relative to the bit connections of the decoded pre-tap value, $D_A$, and shifted post-tap value, $S_C$. Specifically, select logic circuit 523 receives bit zero of the decoded pre-tap and shifted post-tap values (i.e., bits $D_A[0]$ and $S_C[0]$), but bit six of the decoded data value (i.e., $D_B[6]$). Similarly, select logic circuit $523_1$ receives $D_A[1]$ and $S_C[1]$, but $D_B[5]$. Generally stated, if there are N bits within each of the decoded and shifted values, an $i^{th}$ one of the select logic circuits receives bits $D_A[i]$, $S_C[i]$ and $D_B[(N-1)-i]$. By this arrangement, any high bits within the decoded data value are effectively shifted to the leftmost positions within the overall bit field. Consequently, so long as the total number of decoded bits within values, $D_A$, $D_B$, and $D_C$ is equal to or less than the number of sub-driver circuits, none of the high bits within the left-shifted decoded data value will occupy bit positions occupied by high bits within the decoded pre-tap value, $D_A$ or the shifted post-tap value, $S_C$. Note that, in alternative embodiments the same effect may be achieved by shifting the decoded data value or decoded pre-tap value instead of the post-tap value and that, similarly, the select logic connections of the decode pre- or post-tap values may be reversed instead of the decoded data value connections. In any case, the overall group of shifted, decoded values forms a control value, referred to herein as an allocation control word, that indicates the sub-driver pool (pre-tap, post-tap or data) to which sub-drivers within the allocated driver circuit 471 are to be allocated.

Table 560 of FIG. 21 illustrates, by way of example, the logical operation of an $i^{th}$ one of the select logic circuits $523_0$-$523_6$ of FIG. 18. Because of the bit shifting achieved by the shift circuit 519 and the reversed bit connections of the decoded data value, $D_B$, at most one of the input values, $S_C[i]$, $D_B[6-i]$ and $D_A[i]$ will be high for a given value of i. If none of the input values is high (as in the first row of table 560), the two constituent bits of allocation control bit pair, $AC_i$ (i.e., $AC_i[1]$ and $AC_i[0]$), are both low, thereby selecting the disabled condition for the corresponding sub-driver. If the decoded pre-tap bit, $D_A[i]$ is high, ACi[1:0]=01 to allocate the corresponding sub-driver to the pre-tap sub-driver pool (i.e., enable the sub-driver to be controlled by the pre-tap data value). If the decoded data bit, $D_B[6-i]$ is high, ACi[1:0]=10 to allocate the corresponding sub-driver to the data sub-driver pool, and if the shifted post-tap bit, $S_C[i]$ is high, ACi[1:0]=11 to allocate the corresponding sub-driver to the post-tap sub-driver pool.

FIG. 22 illustrates an exemplary embodiment of a select logic circuit 570 that operates in accordance with the logic table 560 of FIG. 21. Logic OR gate 571 receives a shifted post-tap bit $S_C[i]$ and a decoded pre-tap bit $D_A[i]$ so that $AC_i[0]$ is high if either the decoded pre-tap bit or the shifted post-tap bit is high. Logic OR gate 573 receives the shifted post-tap bit $S_C[i]$ and a decoded data bit, $D_B[6-i]$ so that, $AC_i[1]$ is high if either the decoded data bit or the shifted post-tap bit is high.

It should be noted that while the equalizing driver 470 of FIG. 16 has been described as enabling a specific number of sub-driver circuits to one of three driver pools, the equalizing driver may readily be adapted to enable allocation of any number of sub-driver circuits to any number of driver pools. In general, if there are N weight values, $W_1$-$W_N$, each corresponding to a different driver pool, $P_1$-$P_N$, to which sub-driver circuits may be allocated, then each of the weight values may be decoded to generate decoded values, $D_1$-$D_P$, of which values, $D_2$-$D_P$, may be shifted to generate a set of shifted values, $S_2$-$S_P$, such that none of the high bits within any of the shifted values or the decoded value $D_1$ occupy the same bit positions as in another of the values. The shifting operation may performed by any type of shifting circuit capable of performing the following general operations:

$S_2=D_2$ shifted according to $D_1$
$S_3=D_3$ shifted according to $D_1+D_2$
$S_4=D_4$ shifted according to $D_1+D_2+D_3$
. . .
$S_P=D_P$ shifted according to $D_1+D_2+\ldots+D_{P-1}$ Note that the last shift may be effected by reversing the $D_P$ bit connections to the select logic circuits 523 as in the case of the decoded data bit connections in FIG. 18. Also, the shift logic may be simplified by limiting the number of shifts of any pre-tap value, post-tap value or data value according to the maximum anticipated number of sub-drivers needed for the value. For example, one such embodiment includes one pre-tap sub-driver pool, three post-tap sub-driver pools, and one data driver pool, with a maximum of two sub-driver circuits being allocated to either of the pre- and post-tap sub-driver pools. Finally, the present invention is not limited to shift-based logic for allocation of sub-drivers among different sub-driver pools. In general, any combinatorial logic circuit, state-based logic circuit (e.g., state machine or processor) or other circuit for allocating sub-drivers to different driver pools may be used without departing from the spirit or scope of the present invention. Also, rather than allocating sub-driver circuits according to decoded weight values, decoded values themselves may be provided (e.g., from a configuration circuit or off-chip source) to control the allocation of sub-drivers. For example, values that directly represent the state of the allocation control signals, AC, may be stored in a configuration circuit or otherwise provided to the equalizing driver of FIG. 16 to control the allocation of sub-drivers among different driver pools.

Although equalizing output drivers have described in reference to FIGS. 4-22 in terms of equalizing a data transmission to counteract the affect of ISI from signals transmitted on the same signal path, such equalizing output drivers may additionally (or alternatively) be applied to compensate for cross-talk (e.g., inductive coupling) from signals on neighboring signal paths. For example, any of the equalizing sub-drivers disclosed herein (including allocated sub-drivers) may be controlled by a data value being transmitted on an adjacent signal path to increase or decrease the drive strength of the subject data transmission to counteract cross-talk (or other form of interference) from the adjacent signal path.

Equalizing Receiver with Reduced Parasitic Capacitance

Figure 23:
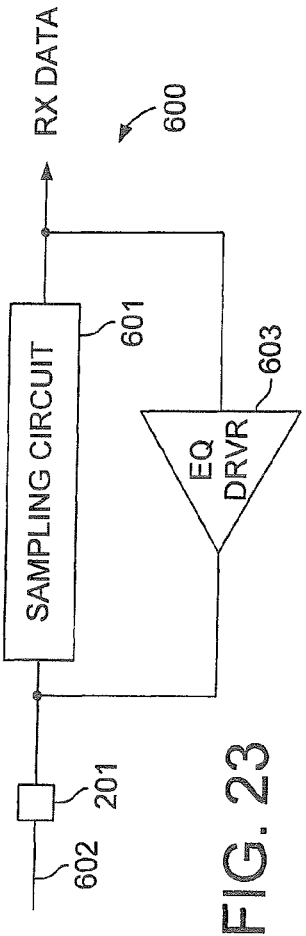
FIG. 23 illustrates an equalizing receiver according to an embodiment of the present invention.

FIG. 23 illustrates an equalizing receiver 600 according to an embodiment of the present invention. The equalizing receiver 600 includes a sampling circuit 601 and equalizing driver 603. The sampling circuit 601 samples a signal received via pad 201 (i.e., from a bus, point-to-point link, or other signaling path) and outputs receive data (RX DATA) for use by other circuitry (not shown) within an integrated circuit that contains the equalizing receiver 600. The equalizing driver 603 includes an input coupled to receive one or more of the data samples recovered by the sampling circuit 601, and an output coupled to the pad 201. In one embodiment, the equalizing driver includes a plurality of post-tap sub-drivers, each for driving an equalization signal onto the output line according to a data value received by the sampling circuit. By this operation, the signal level of line 602 is effectively adjusted to counteract the ISI of previously transmitted signals. The equalizing driver 603 may be implemented using any of the equalizing output driver embodiments described in reference to FIGS. 4-22, with the pre-tap and data values being omitted or replaced by post-tap values supplied by the sampling circuit 601. Also, as with all the equalizing output drivers discussed in reference to FIGS. 4-22, the equalizing driver 603 may be used to perform binary-level signal equalization as well as multi-level signal equalization. Also, in alternative embodiments, the equalizing driver 603 may be used to adjust a threshold reference value (i.e., used to distinguish between signal levels for signal reception purposes) instead of driving an equalizing signal onto the signaling path.

System Application of Equalizing Transceiver

Figure 24:
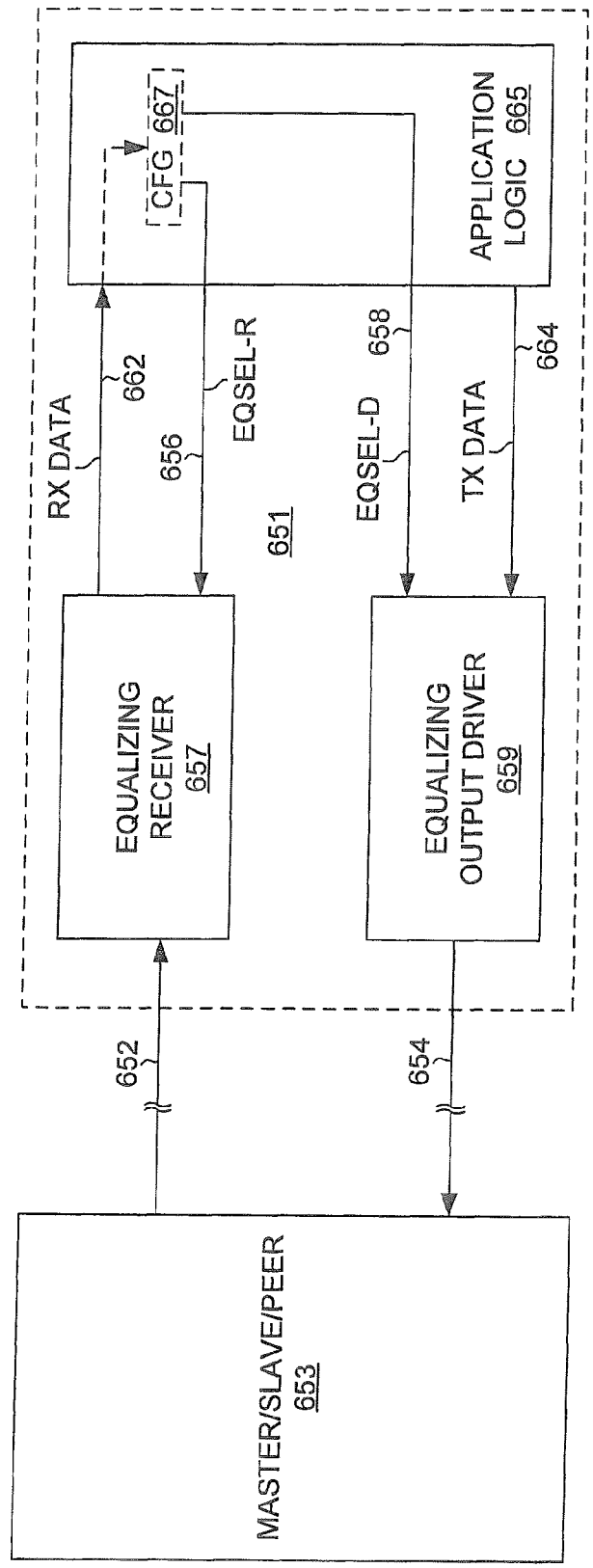
FIG. 24 illustrates a signaling system in which an equalizing driver and/or equalizing receiver according to embodiments of the present invention may be used.

FIG. 24 illustrates a signaling system 650 in which an equalizing driver and/or equalizing receiver according to embodiments described in reference to FIGS. 4-23 may be used. The system 650 may be used, for example, within a computing device (e.g., mobile, desktop or larger computer), networking equipment (e.g., switch, router, etc.), consumer electronics device (e.g., telephone, camera, personal digital assistant (PDA), etc.), or any other type of device in which signal equalization is beneficial. More specifically, the system 650 may be a memory subsystem or any other subsystem within such computing device, networking equipment, consumer electronics device, etc.

The system 650 includes a pair of integrated circuits (ICs) 651 and 653 coupled to one another via a receive signal path 652 and a transmit signal path 654. In the embodiment, shown, the signal paths 652 and 654 are unidirectional high-speed serial links for conducting serialized transmissions from one IC to the other. In alternative embodiments, either or both of the links may be bi-directional (i.e., with appropriate circuitry provided to select which of the ICs is enabled to transmit on the link at a given time), and multiples of such signal paths may be provided to enable transmission of parallel groups of symbols (e.g., each group of symbols forming a data or control word (e.g., command, address, etc.) or portion of a data or control packet). Each transmitted symbol may be a binary symbol (i.e., 0 or 1) or, in the case of a multi-level signaling system, a symbol having more than two possible states. Also, the receive signal path 652, transmit signal path 654, and/or shared transmit-receive signal path may be a multi-drop bus that is coupled to additional ICs. The ICs 651 and 653 may be peers (e.g., each IC is capable of independently initiating a signal transmission to the other), or master and slave. Also, the relative status of the ICs 651 and 653 may change from time-to-time such that one IC is a master at a first time, then a slave at another time, and/or a peer at another time.

IC 651 is shown in simplified block diagram form and includes an equalizing output driver 659, equalizing receiver 657 (the equalizing receiver and equalizing output driver together forming an equalizing transceiver), and application logic 665. In an alternative system in which communications between devices 651 and 653 are unidirectional, either the equalizing receiver 657 or equalizing output driver 659 may be omitted from device 651 (i.e., depending on the signaling direction). Also, though not shown in FIG. 24, an equivalent equalizing receiver and/or equalizing output driver may be included within the device 653. In any case, the equalizing receiver 657, equalizing output driver 659, or both the equalizing receiver 657 and equalizing output driver 659 may be implemented using any of the equalizing output driver/receiver embodiments described above in reference to FIGS. 4-23.

A configuration circuit 667 (e.g., register, one-time programmable circuit, non-volatile memory, etc.) may be provided within the application logic 665 or elsewhere in IC 651 to store one or more equalization select values (e.g., weight values or other values that indicate the relative signal strengths of pre-tap, post-tap and/or data values, including data values to be transmitted on neighboring signal paths). In the embodiment of FIG. 24, for example, a receiver equalization select value 656 (EQSEL-R) is stored in the configuration circuit 667 and supplied to the equalizing receiver 657, and an output driver equalization select value 658 (EQSEL-D) is stored in the configuration circuit 667 and supplied to the equalizing output driver 659. A similar configuration circuit may be provided within IC 653 to establish receiver and/or output driver equalization levels. The equalization select values may be stored within the configuration circuit 667, for example, during production time (e.g., in a fusible or otherwise one-time programmable store operation) or during system run-time. The equalization select values may be generated within the IC 651 (e.g., as a result of calibration activity) or, as shown in FIG. 24, received by the equalizing receiver 657 and supplied to the application logic 665 for storage in the configuration circuit 667. The equalization select values may also be input to the IC 651 through another access path (e.g., test access port or other communication port).

Although two ICs are depicted in FIG. 24 (i.e., ICs 651 and 653), the circuits within each of the ICs may alternatively be implemented in a single IC (e.g., in a system-on-chip or similar application), with signal paths 652 and 654 being routed via metal layers or other signal conducting structures fabricated within the IC. Further, if distinct ICs are provided as shown in FIG. 24, the ICs may be packaged in separate IC packages (e.g., plastic or ceramic encapsulation, bare die package, etc.) or in a single IC package (e.g., multi-chip module, paper thin package (PTP), etc.).

Although the invention has been described with reference to specific exemplary embodiments thereof, it will be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A signalling device comprising:
    a first output driver circuit including a first transistor, the first transistor having a control input to receive a first data value and an output coupled to a first output node; and
    a second output driver circuit including a second transistor, the second transistor having a control input to receive a second data value and an output coupled to the first output node, the second transistor having a width-length ratio that is smaller than a width-length ratio of the first transistor; and
    a delay element having an input coupled to the control input of the first transistor and an output coupled to the control input of the second transistor, the delay element being adapted to output the first data value to the control input of the second transistor a predetermined time after the first data value is received at the control input of the first transistor.

2. The signaling device of claim 1, further comprising a second delay element having an input coupled to the control input of the second transistor and an output coupled to the control input of a third transistor, the second delay element being adapted to output the first data value to the control input of the third transistor a predetermined time after the first data value is received at the control input of the second transistor.

3. A signaling device comprising:
    a first output driver circuit including a first transistor, the first transistor having a control input to receive a first data value and an output coupled to a first output node; and
    a second output driver circuit including a second transistor, the second transistor having a control input to receive a second data value and an output coupled to the first output node, the second transistor having a width-length ratio that is smaller than a width-length ratio of the first transistor;
    wherein the first transistor is switched on to couple the output node to a reference node when the first data value is in a first state and wherein the first transistor is switched off when the first data value is in a second state.

4. The signaling device of claim 3, wherein the reference node is a ground reference node.

5. The signaling device of claim 3, wherein the first output driver circuit comprises a current source coupled between the reference node and the first transistor, the current source being adapted to draw a predetermined current from the first output node when the first transistor is switched on.

6. The signaling device of claim 3, wherein the first output driver circuit further comprises a third transistor coupled between the first output node and a supply voltage, the third transistor having a control input coupled to receive the first data value, the third transistor being switched on to couple the output node to the supply voltage when the first data value is in the second state.

7. A signaling device comprising:
    a first output driver circuit including a first transistor, the first transistor having a control input to receive a first data value and an output coupled to a first output node; and
    a second output driver circuit including a second transistor, the second transistor having a control input to receive a second data value and an output coupled to the first output node, the second transistor having a width-length ratio that is smaller than a width-length ratio of the first transistor;
    wherein the first output driver circuit further comprises
        a third transistor having a control input to receive a third data value and an output coupled to the first output node, and
        a decoder circuit having an input to receive an encoded data value and having outputs coupled respectively to the control inputs of the first and third transistors to provide the first and third data values thereto, the decoder circuit being adapted to decode the encoded data value to generate the first data value and the third data value.

8. The signaling circuit of claim 7, wherein the first and third transistors are responsive to the first and third data values to generate an output signal having more than two possible states.

9. A signalling device comprising:
    a first output driver circuit including a first transistor, the first transistor having a control input to receive a first data value and an output coupled to a first output node; and
    a second output driver circuit including a second transistor, the second transistor having a control input to receive a second data value and an output coupled to the first output node, the second transistor having a width-length ratio that is smaller than a width-length ratio of the first transistor;
    wherein the first output driver circuit and second output driver circuit are coupled in parallel to the first output node.

10. The signaling circuit of claim 9, wherein the first output driver circuit outputs a first current and the second output driver circuit outputs a second current that is combined with the first current at the first output node.

11. The signaling circuit of claim 10, wherein the first current is output in response to the first data value and the second current is output in response to the second data value.

12. A method, comprising:
    coupling a first transistor to drive a first data value onto a first output node; and
    coupling a second transistor to drive a second data value onto the first output node, the second transistor having a width-length ratio that is smaller than a width-length ratio of the first transistor; and driving a primary data value onto the first transistor and driving at least one of a pre-tap value or a post-tap value onto the second transistor.

13. A method, comprising:
coupling a first transistor to drive a first data value onto a first output node; and
coupling a second transistor to drive a second data value onto the first output node, the second transistor having a width-length ratio that is smaller than a width-length ratio of the first transistor;
wherein the coupling the first and second transistors includes coupling the first and second transistors in parallel.

14. The method of claim 13, wherein the first data value is represented by a first current and the second data value is represented by a second current that is combined with the first current at the first output node.

* * * * *